United States Patent
Silbermann et al.

(10) Patent No.: US 9,456,623 B2
(45) Date of Patent: Oct. 4, 2016

(54) METHOD AND APPARATUS FOR KILN DRYING OF MATERIAL FOR KILN DRYING

(71) Applicant: BUEHLER GMBH, Braunschweig (DE)

(72) Inventors: Kai Silbermann, Braunschweig (DE); Detlef Reinberg, Peine (DE); Matthias Benz, Braunschweig (DE)

(73) Assignee: BUEHLER GMBH, Braunschweig (DE)

( * ) Notice: Subject to any disclaimer, the term of this patent is extended or adjusted under 35 U.S.C. 154(b) by 0 days.

(21) Appl. No.: 14/416,440

(22) PCT Filed: Jun. 20, 2013

(86) PCT No.: PCT/EP2013/062892
§ 371 (c)(1),
(2) Date: Jan. 22, 2015

(87) PCT Pub. No.: WO2014/016065
PCT Pub. Date: Jan. 30, 2014

(65) Prior Publication Data
US 2015/0201651 A1    Jul. 23, 2015

(30) Foreign Application Priority Data

Jul. 27, 2012   (EP) .................................... 12178180

(51) Int. Cl.
| | |
|---|---|
| F26B 21/04 | (2006.01) |
| A23L 1/015 | (2006.01) |
| A23B 9/08 | (2006.01) |
| C12C 1/073 | (2006.01) |
| C12C 1/135 | (2006.01) |
| C12C 1/15 | (2006.01) |
| B23P 15/26 | (2006.01) |
| F26B 21/00 | (2006.01) |

(52) U.S. Cl.
CPC ................ *A23L 1/0151* (2013.01); *A23B 9/08* (2013.01); *B23P 15/26* (2013.01); *C12C 1/073* (2013.01);

(Continued)

(58) Field of Classification Search
CPC ........ F26B 19/00; F26B 21/00; F26B 21/04; A23L 1/0151; A23L 3/00; A23L 3/40; F24C 15/00; F24C 15/32; B23P 15/26
USPC ................ 34/381, 413, 497, 201, 210, 218; 219/386, 400; 99/476
See application file for complete search history.

(56) References Cited

U.S. PATENT DOCUMENTS

| | | |
|---|---|---|
| 3,730,845 A | 5/1973 | Schultz |
| 4,914,834 A * | 4/1990 | Sime ...................... F26B 21/02 34/169 |

(Continued)

FOREIGN PATENT DOCUMENTS

| | | |
|---|---|---|
| CN | 1692155 | 11/2005 |
| CN | 101619919 | 1/2010 |

(Continued)

OTHER PUBLICATIONS

Adnan H. Zahed, Moustafa M. Elsayed, "Transient Performance of a Natural Ventilation Solar Kiln," Renewable Energy, vol. 4, No. 2, pp. 198-195, 994.

(Continued)

*Primary Examiner* — Stephen M Gravini
(74) *Attorney, Agent, or Firm* — Greenblum & Bernstein, P.L.C.

(57) ABSTRACT

The invention relates to a method for kiln drying of material for kiln drying or kilning material, especially cereals, pseudocereals, oilseeds or legumes, and to an apparatus especially for conduction of the method, wherein the method includes, as process steps, provision of kilning material to be treated on a tray (20) having at least one opening (21) for formation of a layer of kilning material (D) and the production of a gas flow, especially of an air flow (L), and wherein the gas flow, especially the air flow (L), through the layer of kilning material (D) is generated from a space (X) facing the layer of kilning material (D) in the tray (20) having at least one opening (21) to a space (Y) facing away from the layer of kilning material (D) in the tray (20).

22 Claims, 8 Drawing Sheets

Figure 1:
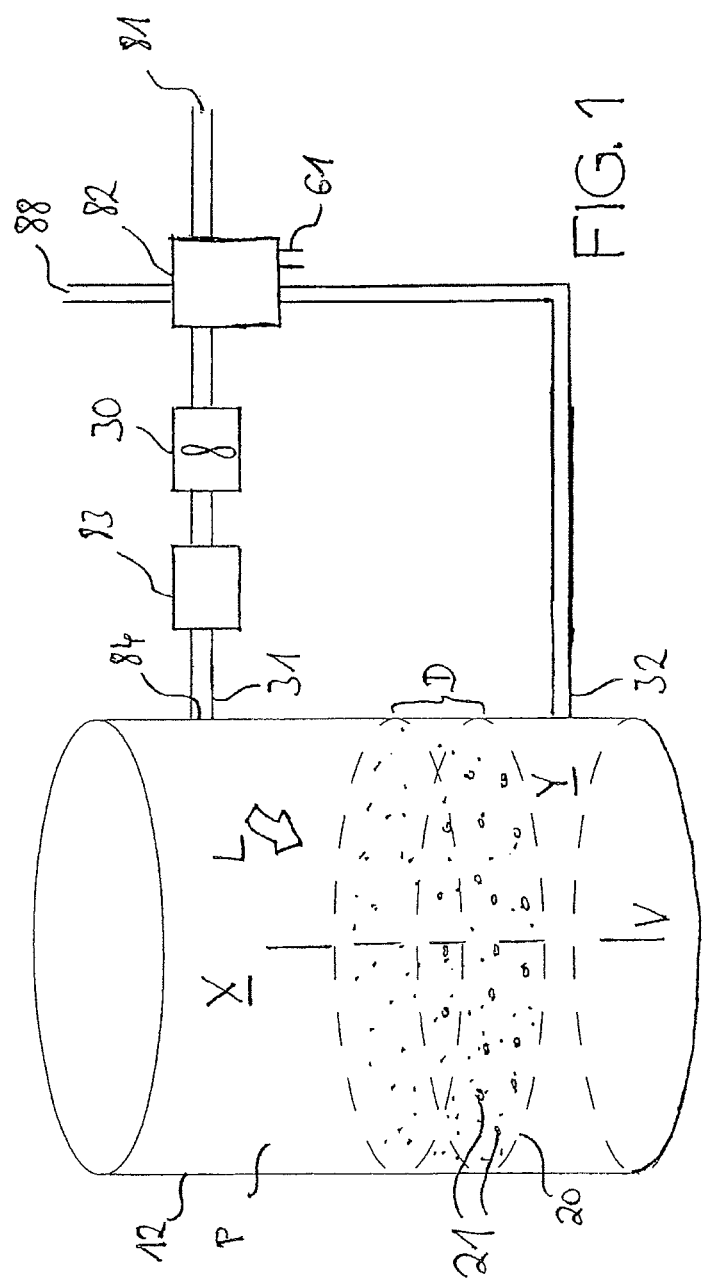

(52) U.S. Cl.
CPC .............. *C12C 1/135* (2013.01); *C12C 1/15* (2013.01); *F26B 21/004* (2013.01); *A23V 2002/00* (2013.01); *Y10T 29/49352* (2015.01)

(56) References Cited

U.S. PATENT DOCUMENTS

| | | | |
|---|---|---|---|
| 5,420,393 A | 5/1995 | Dornbush et al. | |
| 5,632,097 A * | 5/1997 | Snitchler | F26B 17/006 |
| | | | 34/166 |
| 5,651,193 A * | 7/1997 | Rhodes | F26B 25/009 |
| | | | 34/531 |
| 5,832,627 A * | 11/1998 | Hiebert | F26B 15/122 |
| | | | 34/224 |
| 5,992,044 A * | 11/1999 | Hanig | F26B 25/002 |
| | | | 34/167 |
| 7,665,226 B2 * | 2/2010 | Tsuruta | A23B 4/015 |
| | | | 219/688 |
| 7,730,633 B2 * | 6/2010 | Jurkovich | A23N 17/005 |
| | | | 34/381 |
| 8,365,436 B2 * | 2/2013 | Docters Van Leeuwen | A01C 3/00 |
| | | | 165/10 |
| 8,464,437 B1 * | 6/2013 | Weisselberg | F26B 17/003 |
| | | | 110/219 |
| 8,680,229 B2 * | 3/2014 | Maeda | B01J 19/1862 |
| | | | 264/344 |
| 8,720,082 B2 * | 5/2014 | Kemper | A23K 1/001 |
| | | | 210/774 |
| 9,015,958 B2 * | 4/2015 | Bloemendaal | F26B 3/06 |
| | | | 324/664 |
| 2005/0170043 A1 | 8/2005 | Harris | |
| 2015/0201651 A1 * | 7/2015 | Silbermann | A23B 9/08 |
| | | | 426/627 |

FOREIGN PATENT DOCUMENTS

| | | |
|---|---|---|
| DE | 1 031 724 B | 6/1958 |
| DE | 1 917 972 A1 | 11/1969 |
| DE | 30 03 143 A1 | 9/1981 |
| DE | 30 49 107 A1 | 7/1982 |
| DE | 33 41 956 A1 | 5/1985 |
| DE | 34 07 685 C1 | 8/1985 |
| EP | 0 054 749 A2 | 6/1982 |
| EP | 0 107 925 A1 | 9/1983 |
| EP | 0 691 294 A1 | 1/1996 |
| GB | 402100 A * | 11/1933 |

OTHER PUBLICATIONS

Chinese Office Action issued in Patent Appl. No. 201380035516.3, dated Feb. 16, 2016, along with an english translation thereof.

* cited by examiner

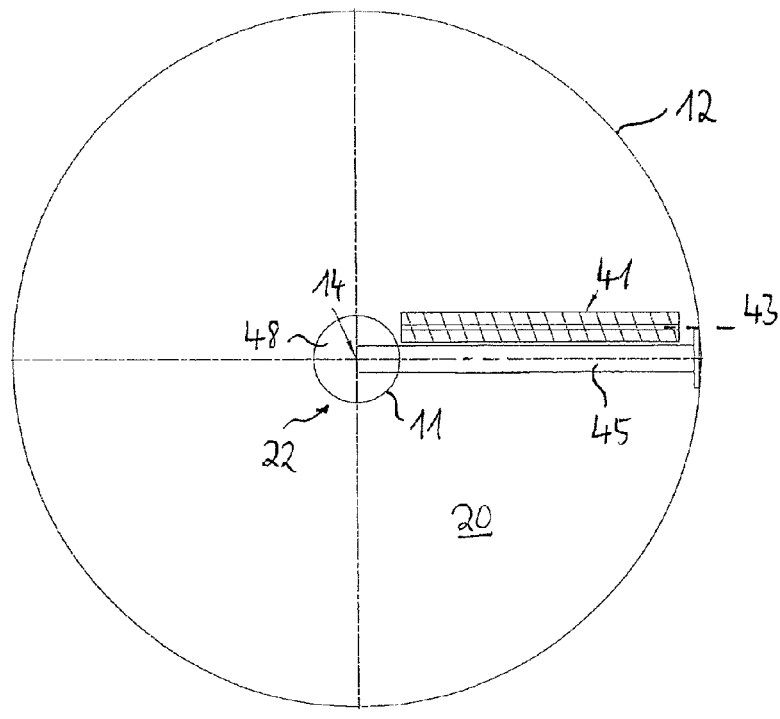
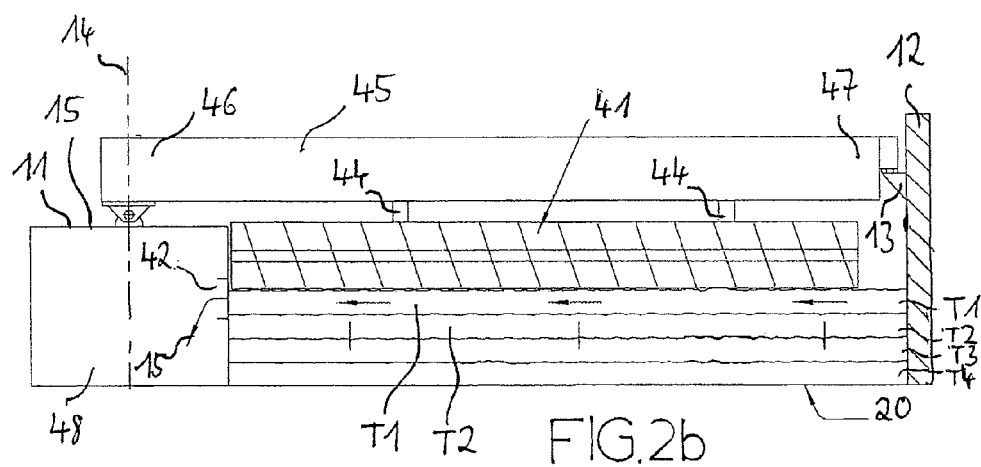

METHOD AND APPARATUS FOR KILN DRYING OF MATERIAL FOR KILN DRYING

The invention relates to methods as well as apparatuses for kiln drying of material for kiln drying or kilning material, a product obtained therewith as well as a method for upgrading and/or converting or refitting an apparatus according to the preambles of the independent claims.

In connection with cereals, in particular brewing barley, the maceration and germination of grain and the subsequent drying or kiln drying of grain for producing storable malt for the actual beer brewing is of particular importance. An apparatus for drying grain is called drying kiln or kiln drier Such macerating and/or germinating steps as well as subsequent kiln drying steps are used for further food and plant species such as legumes, for example lentils, pseudocereals and oilseeds. Different further food is dried for improving the storage life.

In connection with kiln drying, care must be taken that all layers of the kilning material are through dried as uniformly as possible and that certain limiting temperatures are not exceeded. If such limiting temperatures, which can, i.a., depend on the kind of kilning material, are exceeded, enzymes can be destroyed or the color or taste of the kilning material can change in an undesired manner.

Methods and apparatuses for kiln drying kilning material by means of which the kilning material is dried by an air flow so that it becomes suitable for storage are known from the prior art. A plate with openings or orifices on which the kilning material is layered is normally arranged in such kiln drying apparatuses. Such a plate is normally referred to as tray. In known methods using such apparatuses, an air flow is generated below the tray, wherein the air flows through the openings of the tray from the bottom to the top towards the material to be kiln dried.

In order to ensure that the entire material to be kiln dried is through dried as uniformly as possible and in particular in order to prevent local overheating, in such known methods the duration, the heating energy input, the electrical drive energy for the fans as well as the heat recovery must be coordinated in an involved manner.

Moreover, the publication "Transient performance of a natural ventilation solar kiln" (Adnan H. Zahed, Moustafa M. Elsayed, Renewable Energy, Vol. 4, No. 2, pp. 198-95, 994) discloses a method for kiln drying kilning material by means of a solar kiln. In a solar kiln, the kilning material is kiln dried by means of a naturally generated air flow which can reach the kilning material from both the top and the bottom. A method using a solar kiln has the basic disadvantage that the drying of the kilning material depends on the weather and therefore can hardly be controlled. Moreover, in this case the kilning material is dried from the superficial layers substantially by an air flow flowing over it, so that a uniform through drying of the entire kilning material is hardly guaranteed. Furthermore, the naturally generated air flow is only very faint so that only very small layer thicknesses can be dried. Moreover, because of the low flow speed, drying takes a very long time. All these factors render the known method extremely uneconomical.

Also U.S. Pat. No. 5,420,393 discloses a device for heating food, wherein a horizontal air flow generated centrally with respect to a tray is directed along the lower and upper surface layers of the kilning material. Here, too, a uniform through drying of the entire kilning material is hardly guaranteed. An almost uniform through drying is only possible with very small layer thicknesses, which renders also this method uneconomical. Moreover, the device is not suitable for being used in large scale industry.

Therefore, it is an object of the present invention to provide methods and apparatuses for kiln drying which overcome the described disadvantages of the prior art. In particular, simplified methods for kiln drying as well as apparatuses by means of which the kilning material can be dried uniformly and gently should be provided.

According to the invention, this object is achieved by the methods and apparatuses comprising the features of the independent claims.

The method according to the invention for kiln drying kilning material, in particular cereals, pseudocereals, oilseeds or legumes, includes as a first method step a provision of kilning material to be treated on a tray having at least one opening for forming a layer of kilning material. In a further method step, a gas flow, in particular an air flow, is generated, wherein the gas flow is generated from a space of the tray facing the layer of kilning material to a space of the tray facing away from the layer of kilning material through the layer of kilning material and through the tray.

It was found that such a method guarantees in a simple manner a uniform and gentle through drying of the kilning material. This is because on the one hand the gas flow does not have to move the water to be removed from the kilning material contrary to the effective direction of gravity, like in a conventional gas flow, from the bottom to the top. Rather, the water is moved along the effective direction of gravity, which is much more efficient. Moreover, the water can be removed from the kilning material more quickly. The drying process is thus as a whole quicker, which also counteracts an undesired heating of the kilning material. Furthermore, the topmost layer of the kilning material is first dry so that the dry kilning material can then be easily removed and transported out of a process space of the apparatus.

The opening of the tray should be dimensioned and arranged in such a manner that the kilning material does not fall through it and at the same time a gas flow can flow through it.

The gas flow, in particular the air flow, is preferably generated by means of at least one fan, in particular a venting fan.

A gas flow from a space of the tray facing the layer of kilning material to a space of the tray facing away from the layer of kilning material can be generated on the one hand by a fan which is arranged in the space facing the layer of kilning material and the pressure side of which is directed towards the layer of kilning material and towards the tray. Alternatively or additionally, the gas flow can be generated by means of a fan which is arranged in the space facing away from the layer of kilning material and the suction side of which is directed towards the tray and towards the layer of kilning material.

The method according to the invention is preferably carried out in a kiln drier. However, it is also conceivable that the method according to the invention is carried out in a modified germinating and kilning vessel or a modified macerating, germinating and kilning vessel. In a germinating and kilning vessel, water is sprayed onto the kilning material during a preceding germinating step. A macerating, germinating and kilning vessel comprises, in addition to a kiln drier, at least one water supply conduit and one water removal conduit, so that the material to be treated can be watered on a tray in a preceding germinating step.

The air flow preferably flows at an acute angle relative to the effective direction of gravity, in particular substantially parallel to the effective direction of gravity, through the layer of kilning material, i.e. from a space above the tray to a space below the tray.

A first method step of an alternative of the method according to the invention includes the provision of kilning material to be treated on a tray in order to form a layer of kilning material. A further method step includes the generation of a gas flow, in particular an air flow, which flows through the layer of kilning material. In a third method step, a partial layer of the layer of kilning material facing away from the tray is removed at least once, preferably several times from the space facing the layer of kilning material. Removal can take place, for example, by means of a removing means described in more detail below.

A resulting removal in layers from the top to the bottom is advantageous in that the layer resistance for the air flow is continuously reduced since the layer thickness of the kilning material is continuously reduced. Hence, the energy consumption required for the fan(s) is reduced at the same time.

In the third method step, removal is preferably carried out by means of a removing means which is rotatable relative to the tray about an in particular vertical axis. The removing means can be rotatable about this axis while the tray does not move. Alternatively, it is also conceivable and within the scope of the invention that the tray is rotatable about the axis and the removing means does not move about this axis. By rotating the removing means about the rotational axis relative to the tray, it is then possible that the removing means passes over at least a large part of the surface of the tray if the latter is, e.g., circular or ring-shaped.

In preferred embodiments, the removing means comprises at least one conveying screw by means of which the partial layer of the layer of kilning material can be removed. Such an embodiment is particularly simple in terms of construction. Moreover, a conveying screw prevents the kilning material from damage, because it causes in particular only little breaking of the kilning material.

The conveying screw can be rotated about a rotational axis forming a longitudinal axis of the conveying screw. Advantageously, this longitudinal axis extends substantially in the horizontal direction. Particularly advantageously, the conveying screw is additionally rotatable about a substantially vertical rotational axis relative to the tray. For example, the conveying screw can be rotatable about this axis while the tray does not move. Alternatively, it is also conceivable and within the scope of the invention that the tray is rotatable about a substantially vertical axis and the conveying screw does not move about this axis. By rotating the conveying screw about the rotational axis relative to the tray it is then possible that the conveying screw passes over at least a large part of the surface of the tray if the latter is, e.g., circular or ring-shaped.

Alternatively or additionally, the removing means can also comprise at least one scraper which is configured and movable relative to the tray in such a manner that kilning material on the tray can be removed by using the scraper. To this end, the scraper can have at least one removing surface which can come in contact with the kilning material in order to remove it. In particular, the scraper can be rotatable about a vertical rotational axis and thus pass over, e.g., at least a large part of the surface of a circular or ring-shaped tray. For example, one or more scrapers can be arranged at a common beam which can extend in the horizontal direction and can be rotatable about the vertical rotational axis. The apparatus can also comprise a plurality of beams, for example three to six beams, which can be arranged in the circumferential direction about the vertical rotational axis, in particular at a regular angular distance. One or more scrapers can be arranged at each of the beams.

The removing surface can be planar or curved. If the scraper is rotatable about a vertical rotational axis, preferably at least part of the removing surface extends at an angle relative to a radial direction extending perpendicular with respect to the rotational axis. "At an angle" means that the radial direction does not extend parallel to the removing surface. If the removing surface is curved, "at an angle" means that the radial direction does not extend parallel to a respective tangential plane on at least a part of the removing surface.

An angular course guarantees that a part of the layer of kilning material can, because of the rotation of the scraper about the vertical rotational axis, be removed into the central area or the outer area of the tray—depending on the angle and the rotational direction of the scraper. In some embodiments, the scraper is configured as a planar and, e.g., rectangular sheet or plate extending at an angle relative to the radial direction.

It is also preferred that the partial layer of the layer of kilning material is conveyed in the direction of a central area of the tray and thus removed. In particular, the tray can be configured as a horizontally-aligned plate with a substantially ring-shaped base surface, wherein a central opening of this ring-shaped base surface forms the central area.

A collecting means for the kilning material which has a central unloading opening for removing the kilning material can extend through the central opening of the tray. In the following, this collecting means is referred to as dome. The dome can be, e.g., tubular and have a circular cross-section in a horizontal plane. The dome can have at least one removal opening through which the kilning material can be conveyed from the tray into the unloading opening, in particular by means of at least one conveying screw and/or at least one scraper. The removal opening can be arranged at the side or the top surface of the dome.

Removal in the direction of the central area ensures that the kilning material can be collected in a comparatively small space, in particular by means of a dome having a comparatively small diameter. Moreover, the kilning material can be moved into the central area both by means of a moving removing means and by means of a moving tray. Removal in the direction of an outer area of a non-moving tray by means of a removing means that is rotatable about a vertical axis causes the kilning material to be moved to different places along the outer area, which makes the collection of the kilning material clearly more difficult.

Alternatively to a ring-shape, the tray can also have a different shape. For example, it can have an angular, in particular rectangular outer contour. Kilning material on such a tray can be removed, e.g., by using a scraper which is movable along the tray in a substantially horizontal direction.

Particularly advantageously, the removal opening is adjustable. The term "adjustable" means on the one hand that the position of the removal opening relative to the tray and/or the removing means, in particular the conveying screw and/or scraper is adjustable. For example, it is possible that the dome as a whole is movable in the vertical direction. Alternatively or additionally, the term "adjustable" means that the size and/or the shape of the removal opening is adjustable. This can be achieved, e.g., by at least one closure element which is arranged relative to the removal opening in such a movable, in particular sliding and/or swiveling manner that, depending on the relative position between closure element and removal opening, different portions of the removal opening are released. The closure element can be a slide which can be swiveled relative to the dome about an in particular vertical axis. Alternatively or additionally, the slide can also be slidable in a vertical direction relative to the dome. In particular, the removal opening is adjustable in such a manner that the height of the respective lowermost point of the released part of the removal opening is adjustable.

Since the removal opening is adjustable, it is possible that only a specific portion of the kilning material which is conveyed by the removing means can enter the unloading opening of the dome through the removal opening. For example, in a first position of a slide, the lowermost point of the released portion can lie at a first height, and in a second position of the slide the lowermost point can lie at a second, lower height. In the first position the kilning material which is located above the first height can then be removed. In the second position additionally the kilning material which is located between the first height and the second height can be removed.

Advantageously, the dome is rotatable about a substantially vertical axis relative to the tray. In particular, the dome can be rotatable while the tray does not move. It is particularly favorable if this vertical axis coincides with the rotational axis of the conveying screw or the scraper, and the dome and the conveying belt or the scraper commonly rotate about this axis. It is thus possible that the kilning material is always conveyed by the conveying screw or the scraper towards the at least one removal opening. However, alternatively also the tray can be rotatable while the dome does not move.

The removal opening can be adjustable in a stepwise manner or continuously. For this purpose, for example the closure element, in particular the slide, can be adjustable in a stepwise manner or continuously.

Preferably, only a partial layer facing away from the tray, in particular an uppermost partial layer of the layer of kilning material, which is dry, is removed. In particular, it is possible to remove only a partial layer of the layer of kilning material whose humidity is below a predefined boundary humidity, while another partial layer of the layer of kilning material whose humidity is still above the predefined boundary humidity is not removed. This predefined boundary humidity can lie, e.g., below 15%, below 10% or below 5%, wherein a boundary humidity below 5% is particularly preferred for brewing malt.

By drying the kilning material only as long as necessary, it is possible to further reduce the energy consumption. Moreover, a particularly homogeneous drying in the removed layers of kilning material can be achieved.

Such a method for a partial removal of the layer of kilning material from the top to the bottom is also conceivable if—in contrast to the alternative described above—the gas flow flows through the tray and the layer of kilning material from the bottom to the top.

However, a combination of these two method aspects is particularly advantageous: Because of the gas flow flowing from the top to the bottom, first a respective uppermost partial layer of the layer of kilning material becomes dry and can then be removed. The kilning material which remains directly below the previously removed partial layer of the layer of kilning material can thus be directly ventilated by the gas flow and can be dried particularly quickly and uniformly.

Preferably, in at least some performances of the third method step, a partial layer of the layer of kilning material facing away from the tray is removed, the vertical dimension of this partial layer being at most 50%, preferably at most 25% and particularly preferably at most 10% of the vertical dimension of the entire layer of kilning material before the third method step has been carried out for the first time.

If the vertical dimension of the layer of kilning material is below a certain minimum dimension, it can be the case that individual channels through which the gas flow then exclusively flows are formed in the layer of kilning material because of the effect of the gas flow. This would lead to a non-uniform drying. Therefore, care is preferably taken that during removal a layer of kilning material which has a predefined minimum dimension is lying on the tray. This predefined minimum dimension depends, i.a., on the kind of kilning material. For example, it can be 30 cm.

When carrying out the third method step for the last time, thus possibly a partial layer can be removed whose vertical dimension is larger than that of the previously removed partial layers. For example, from an original layer of kilning material having a dimension of 100 cm, first seven partial layers having a dimension of 10 cm can be removed so that there is a remaining dimension of 30 cm. For not falling below a predefined minimum dimension of 30 cm, the entire remaining partial layer of 30 cm is removed in one single further performance of the third method step.

In many embodiments, an air flow taken from the environment is used as the gas flow. Optionally, the relative air humidity of the air flow can be adjusted before contacting the kilning material by either adding or removing humidity. However, in many cases it is sufficient if the relative air humidity of the air flow taken from the environment remains unchanged.

The gas flow, in particular the air flow, used in the method according to the invention can have, e.g., a temperature of 30° C. to 130° C. However, this temperature can depend, i.a., on the kind of kilning material and/or the desired final humidity.

The gas flow, in particular the gas flow, can be heated to a desired temperature by means of heaters known per se.

With regard to energetic aspects it is particularly advantageous if a part of the thermal energy of a part of the gas flow which has already flown through the layer of kilning material (flowing-out gas flow) is transferred to a part of the gas flow before the latter flows through the layer of kilning material (flowing-in gas flow). This can be done, e.g., by means of at least one heat exchanger, in particular at least one cross-flow heat exchanger through which both the flowing-out gas flow and the flowing-in gas flow are passed. The cross-flow heat exchanger then forms a heater as mentioned above, by means of which the gas flow can be heated, e.g., from an ambient temperature to a first increased temperature.

However, alternatively it is also conceivable and within the scope of the invention that the apparatus comprises at least one first heat exchanger and at least one second heat exchanger, wherein the first heat exchanger is arranged in the flowing-in gas flow and the second heat exchanger is arranged in the flowing-out gas flow. In this case the thermal energy can be transferred by means of a heat exchange fluid from the second heat exchanger to the first heat exchanger.

Water from the kilning material which was absorbed by the gas flow can condense in the heat exchanger. This water can be allowed to escape through an outlet arranged at the heat exchanger.

Preferably, in the flowing-in gas flow at least one further heater can be arranged downstream of the heat exchanger. By means of such a further heater, the gas flow can be further heated from the first increased temperature to a second, further increased temperature.

A further aspect of the invention relates to an apparatus which serves in particular for carrying out the method according to the invention.

The apparatus according to the invention for kiln drying kilning material, in particular cereals, pseudocereals, oilseeds or legumes, comprises a process space with at least one tray arranged therein for receiving a layer of kilning material. The tray has at least one opening. The apparatus further comprises at least one fan for generating a gas flow, in particular an air flow. The opening of the tray should be dimensioned and arranged in such a manner that the kilning material does not fall through it and at the same time a gas flow can flow through it.

According to the invention, the fan is configured and arranged in such a manner that a gas flow, in particular an air flow, can be generated from a space facing the layer of kilning material to a space facing away from the layer of kilning material through the layer of kilning material and through the tray.

The fan can be arranged in a space facing the layer of kilning material and/or can be in fluid connection with the space facing the layer of kilning material in order to generate a gas flow from the space facing the layer of kilning material to the space facing away from the layer of kilning material through the layer of kilning material.

The fan can also be arranged in the space facing away from the layer of kilning material and/or can be in fluid connection with the space facing away from the layer of kilning material and can be configured in such a manner that a gas flow from the space facing the layer of kilning material to the space facing away from the layer of kilning material through the layer of kilning material can be generated.

Such a configuration of the fan should be understood such that a suction side of the fan is directed towards the process space in order to generate a gas flow from the space facing the layer of kilning material to the space facing away from the layer of kilning material through the layer of kilning material.

Furthermore, it is possible that a fan is arranged in the space facing the layer of kilning material and/or is in fluid connection with the space facing the layer of kilning material and it is also possible that a fan is arranged in the space facing away from the layer of kilning material and/or is in fluid connection with the space facing away from the layer of kilning material.

Preferably, the fan is in fluid connection with a conduit for supplying a gas, in particular air, for generating a gas flow from a space facing the layer of kilning material to a space facing away from the layer of kilning material through the layer of kilning material. At the same time or alternatively, the fan can be in fluid connection with a conduit for removing a gas, in particular air, wherein the fan is configured in such a manner that a gas flow from the space facing the layer of kilning material to the space facing away from the layer of kilning material through the layer of kilning material can be generated.

Thus, it is possible to arrange the fan outside the process space and it is advantageously less contaminated because of its distance from the process space.

An alternative of the apparatus according to the invention comprises a process space with a tray arranged therein for receiving a layer of kilning material. The apparatus further comprises a removing means which is rotatable about an in particular vertical axis relative to the tray. As already explained above, the removing means can thus pass over at least a large part of the surface of the tray if the latter is, e.g., circular or ring-shaped.

Preferably, the apparatus is configured in such a manner that the layer of kilning material and the removing means are movable relative to one another substantially along a vertical relative to the tray.

The removing means serves for removing from the tray a partial layer of the layer of kilning material which faces away from the tray, i.e. in particular an uppermost partial layer of the layer of kilning material. On the one hand, the layer of kilning material can be movable vertically relative to the removing means. Alternatively or additionally, the removing means can be movable relative to the layer of kilning material.

The removing means is preferably configured in such a manner that it can be moved, in particular lifted and lowered, relative to the layer of kilning material. Thus, also the layer of kilning material is movable relative to the tray. However, alternatively it is also conceivable and within the scope of the invention that the tray can be lifted and lowered.

The combination of an arrangement of the fan according to the invention and a removing means according to the invention is advantageous in that the gas flow generated by the fan and flowing from the top to the bottom through the layer of kilning material and through the tray causes drying of the respective uppermost partial layer of the layer of kilning material. This uppermost partial layer can be removed by means of the removing means so that the kilning material which remained directly under the previously removed partial layer of the layer of kilning material is directly ventilated by the gas flow and can be dried particularly quickly and uniformly.

The removing means preferably comprises at least one conveying screw for removing and conveying kilning material from the tray. Alternatively or additionally, the removing means can also comprise at least one scraper as described above.

The apparatus according to the invention can comprise a means for cooling the treated kilning material. Preferably, this cooling means is arranged outside the process space in which kiln drying takes place. A respective partial layer of the kilning material which has been removed and conveyed out of the apparatus can be continuously cooled in such a cooling means. At the same time, a further part of the kilning material can be kiln dried in the process space. Since cooling of the treated kilning material conventionally follows the kiln drying process in the process space, the entire process time can be advantageously reduced by this cooling means being arranged outside the process space. For example, cooling takes place by means of a gas flow, preferably by means of an air flow, whose temperature lies below the temperature of the kilning material.

Preferably, a condenser is arranged downstream of the tray. The water from the kilning material which has been absorbed by the gas flow can be discharged through the condenser. This is advantageous in that the gas flow can be circulated because of the resulting reduction in the relative humidity, in particular the relative air humidity. A heat exchanger as described above can take over the function of the condenser.

Preferably, the condenser, in particular a heat exchanger, comprises an outlet for discharging the condensate from the apparatus.

A further aspect of the invention relates to a product, i.e. the treated kilning material, which was obtained by the above-mentioned method according to the invention and/or by means of the above-mentioned apparatus according to the invention.

A still further aspect of the invention relates to a method for upgrading and/or converting or refitting an apparatus for kiln drying kilning material. In accordance with an alternative, this method comprises the step of providing a fan which is configured and arranged in such a manner that a gas flow, in particular an air flow, from a space facing the layer of kilning material to a space facing away from the kilning material through the layer of kilning material and through the tray can be generated. In particular, an already present fan of the apparatus can be re-configured in such a manner that it can be used for generating a gas flow which can flow from a space facing the layer of kilning material to a space facing away from the layer of kilning material through the layer of kilning material. An already present fan, however, can also be arranged at such a position that such a gas flow can be generated by it.

Alternatively or additionally, the method comprises the step of providing a removing means which is configured and arranged in the apparatus in such a manner that the layer of kilning material and the removing means are movable relative to one another substantially along a vertical relative to the tray.

Furthermore, the removing means provided in accordance with the method for upgrading and/or converting or refitting can comprise one, a plurality or all of the features described above.

Figure 3A:
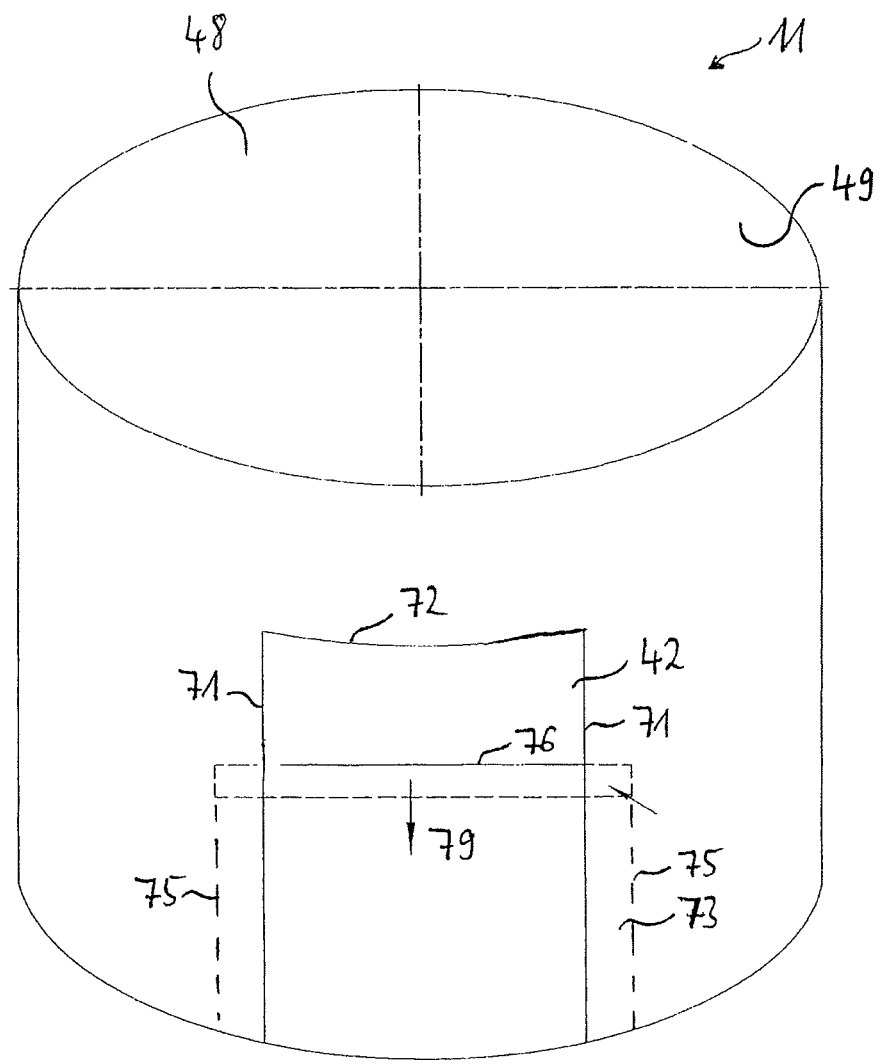
Figure 4A:
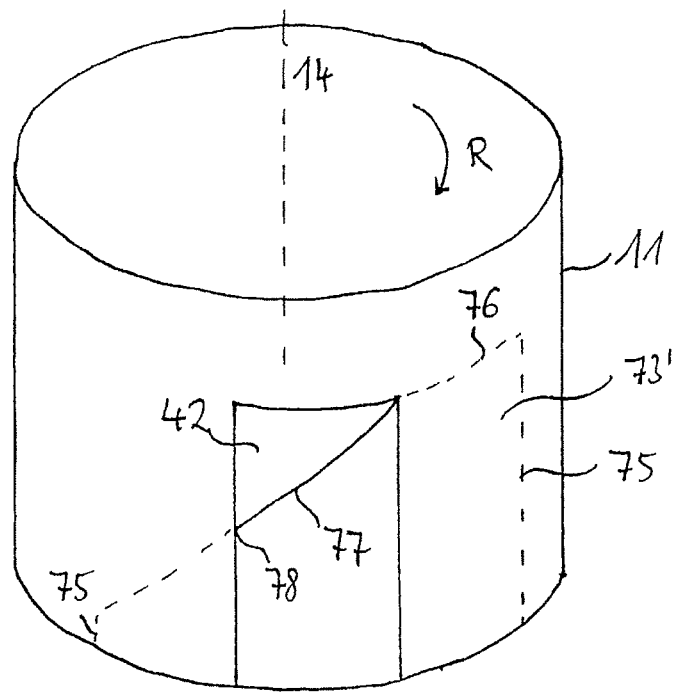
Figure 5A:
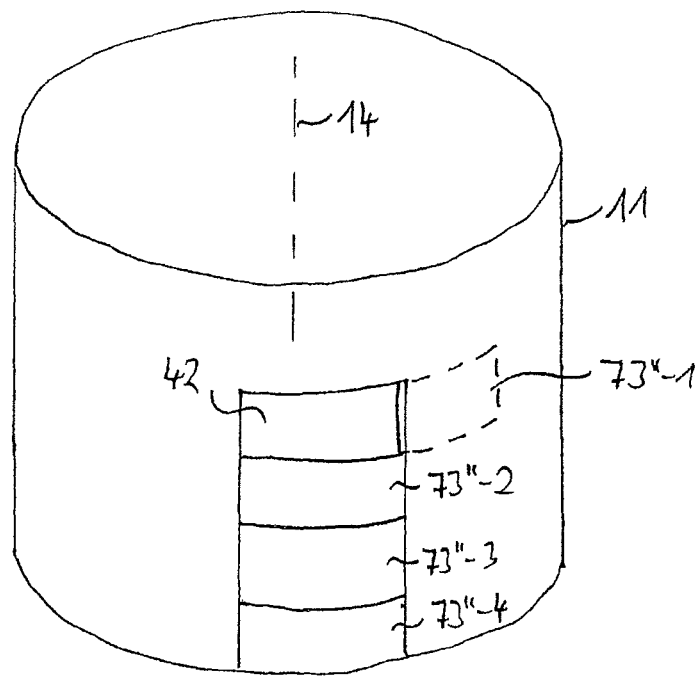
Figure 6A:
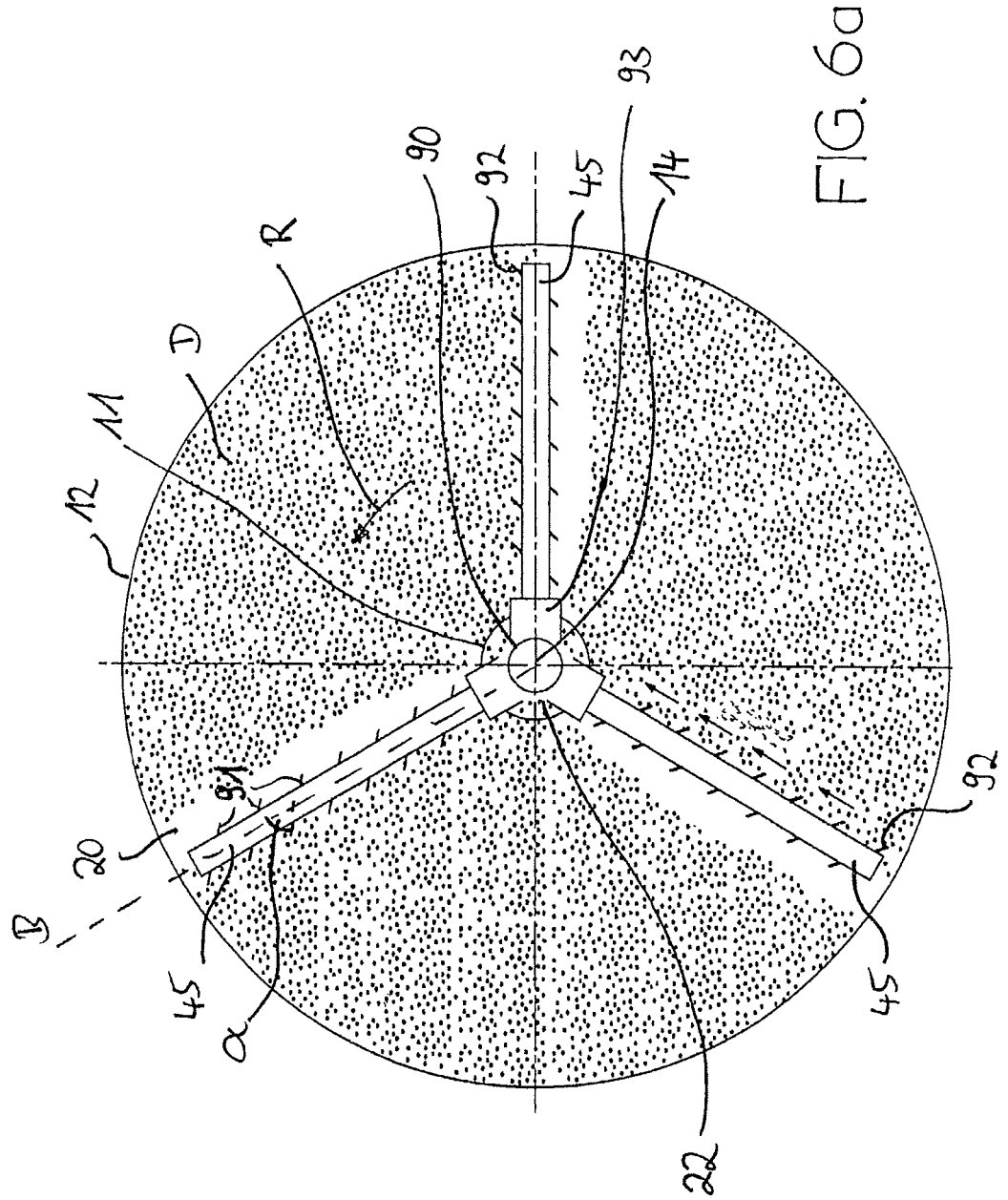

In the following, the invention will be described in more detail on the basis of a plurality of embodiments and drawings without restricting the invention thereto, wherein FIG. 1 shows a schematic view of a first apparatus according to the invention;

FIGS. 2a and b show two views of a second apparatus according to the invention comprising a removing means with a conveying screw;

FIGS. 3a and b show schematic views of a first dome of an apparatus according to the invention;

FIGS. 4a and b show schematic views of a second dome of an apparatus according to the invention;

FIGS. 5a and b show schematic views of a third dome of an apparatus according to the invention;

FIGS. 6a and b show two views of a third apparatus according to the invention comprising a removing means with a plurality of scrapers.

FIG. 1 shows a schematic view of a first apparatus according to the invention. The apparatus comprises a process space P which is enclosed by a wall 12 having the shape of a cylinder jacket. A tray 20 which has a plurality of openings 21 and on which a layer of kilning material D is placed is arranged in the process space P. The layer of kilning material D can comprise, e.g., cereals, in particular brewing malt.

A fan 30 sucks air from the environment through an inlet opening 81, from there the air flows first through first conduits of a cross-flow heat exchanger 82 where it is heated to a first increased temperature. After having flown through the fan 30, the air reaches a further heater 83 where it is heated to a second, further increased temperature. Subsequently, the air flows through a conduit 31 and through an opening 84 arranged in the wall 12 laterally into the process space P. Thus, an air flow L is generated which flows from a space X above the tray 20 from the top to the bottom through the layer of kilning material D and through the tray 20 to a space Y below the tray 20. Below the tray 20, the air is discharged from the apparatus through an air outlet conduit 32.

Further downstream, the air is passed through second conduits of the cross-flow heat exchanger 82 in which it gives off part of its thermal energy to the flowing-in gas flow. In the cross-flow heat exchanger 82, water which the air has absorbed when flowing through the layer of kilning material D can condense. The thus formed condensate can be discharged through an outlet 61. Finally, the air leaves the apparatus through an outlet opening 88.

Starting from here and in the following, equal reference numbers refer to equal components in the Figures.

FIGS. 2a and 2b show two views of a further embodiment. According to the horizontal sectional view of FIG. 2a, the apparatus comprises a cylindrical wall 12. A ring-shaped tray 20 whose openings are not shown for reasons of clarity is arranged inside the wall 12. A cylindrical dome 11 which extends in the vertical direction and comprises a central discharge opening 48 is located in the central area 22 of the tray 20. Furthermore, above the tray 20, the apparatus comprises a conveying screw 41 having a longitudinal axis 43 about which it can be rotated and which extends in the horizontal direction. The conveying screw 41 is attached to a beam 45 which also extends in the horizontal direction.

As shown in the sectional side view of FIG. 2b, the beam 45 is attached to a first, inner end 46 at the top, closed end 15 of the dome 11. Both the dome 11 and the beam 45 are thus supported so as to be commonly rotatable about a vertical axis 14. The outer end 47 of the beam 45 is guided on a ring-shaped rail 13 extending from the wall 12 radially inwardly. The conveying screw 41 is mounted to the beam 45 by means of two holding arms 44 whose length can be adjusted.

The dome 11 has a lateral removal opening 42. By rotating the conveying screw 41, an uppermost partial layer T1 of the layer of kilning material D is conveyed radially inwardly in the direction of the dome 11. There, the partial layer T1 of the layer of kilning material D is conveyed through the removal opening 42 and from there it falls downwardly through the discharge opening 48, as indicated by the arrow 15.

By commonly rotating the conveying screw 41 and the dome 11 about the vertical axis 14, the uppermost partial layer T1 of the layer of kilning material D can be removed over the entire surface of the tray 20 and conveyed into the discharge opening 48.

Subsequently, the conveying screw 41 is lowered, for example by 5 cm, relative to the wall 12, the tray 20 and the dome 11 by adjusting the length of the holding arms 44. By further rotating the conveying screw 41 about its longitudinal axis 43, a second partial layer T2 of the layer of kilning material D can be removed. Alternatively, it is also conceivable and within the scope of the invention that not the conveying screw 41 is lowered but the tray 20 is lifted relative to the wall 12, the conveying screw 41 and the dome 11. In both cases, rotation of the conveying screw 41 about the vertical axis 14 as well as lowering and lifting can of course also take place simultaneously.

In the embodiment described above, thus both the tray 20 and the wall 12 are immovable. However, it is also conceivable and within the scope of the invention that the wall 12 rotates together with the beam 45 and the conveying screw 41 about the vertical axis 14. In this alternative, the outer end 47 of the beam 45 can be firmly connected to the wall 12 so that a ring-shaped rail 13 is not required. Alternatively, it is also conceivable and within the scope of the invention that the tray 20 is rotatable about the vertical axis 14. In this alternative, neither the wall 12 nor the beam 45 must be rotatable about the vertical axis 14. However, the conveying screw 41 should be movable relative to the tray 20 so that the conveying screw 41 can preferably pass over the entire surface of the tray 20.

In the embodiments in which the conveying screw 41 is moved in the vertical direction and the tray 20 is not, it is necessary that the removal opening 42 is adjustable. Otherwise, when removing the first, uppermost partial layer T1, at least in the central area 22 of the tray 20 also a part of the second partial layer D2, which has possibly not yet been sufficiently dried, would be removed. FIGS. 3a to 5b show various embodiments of the dome 11, by means of which such an adjustability of the removal opening 42 can be achieved.

In this connection, FIG. 3a shows a schematic view of a first dome 11 with a removal opening 42. This removal opening 42 is formed by two straight, vertical edges 71 and a horizontal edge 72 extending in the circumferential direction. In the area of the removal opening 42, a slide 73 is arranged which is planar and configured such that it adapts to the internal wall 49 of the dome 11. It is limited by two straight, vertical edges 75 and a horizontal edge 76 extending substantially in the circumferential direction.

The slide 73 is movable in the vertical direction, as indicated by the arrow 79. Depending on the adjustment of the vertical position of the slide 73, a relatively large or small part of the removal opening 42 is released, through which kilning material can enter the discharge opening 48.

Figure 3B:
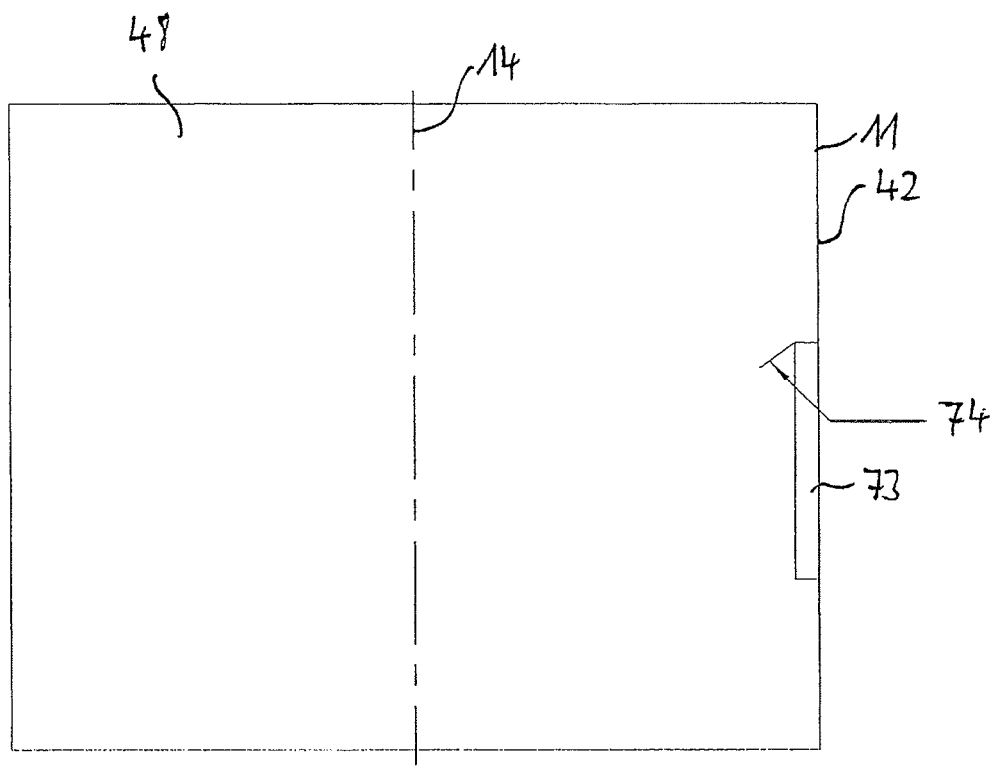

As evident from the sectional side view of FIG. 3b, in the shown embodiment the slide 73 has a guide plate 74 extending from the upper end of the slide 73 in an inclined manner downwardly into the discharge opening 48. By means of this guide plate 74, the flow of the kilning material can be controlled. However, it is also conceivable and within the scope of the invention that the slide 73 does not have any such guide plate 74.

Figure 4B:
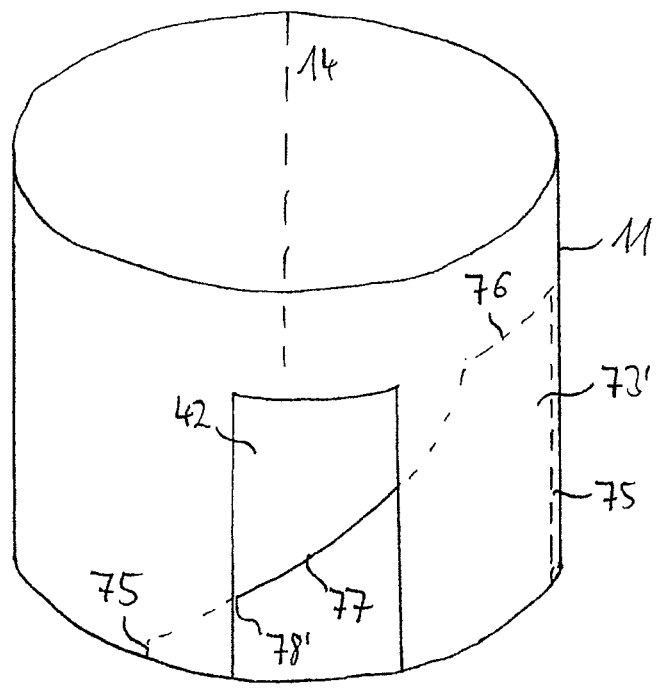

The perspective views of FIGS. 4a and 4b show a further embodiment. The removal opening 42 has the same shape as in the embodiment according to FIGS. 3a and 3b. Also the slide 73' is planar and its shape adapts to the inner wall 49 of the dome 11. However, the slide 73' has an inclined edge 77 which connects one of the two vertical edges 75 and the horizontal edge 76 with each other. During operation of the apparatus, the dome 11 rotates about the vertical axis 14, preferably in the shown rotational direction R. In this rotational direction R, the shorter one of the two vertical edges 75 of the slide 73' is arranged at the front in the rotational direction R while the longer one of the two vertical edges 75 is arranged at the rear in the rotational direction R.

The slide 73' can be swiveled about a vertical axis 14 relative to the dome 11 and, during operation of the apparatus, rotates together with the dome 11 about the axis 14. FIGS. 4a and 4b show two different positions of the slide 73'. In the first position shown in FIG. 4a, a smaller portion of the removal opening 42 is released, wherein the lowermost point 78 of the released portion lies at a first height. In a second position shown in FIG. 4b, the slide 73' has been swiveled about the vertical axis 14, so that now a larger portion of the removal opening 42 is released, and the lowermost point 78' of the released portion lies at a second height being lower than the first height. In the first position according to FIG. 4a, the kilning material being above the first height can be removed; in the second position according to FIG. 4b, additionally the kilning material being between the first height and the second height can be removed.

Figure 5B:
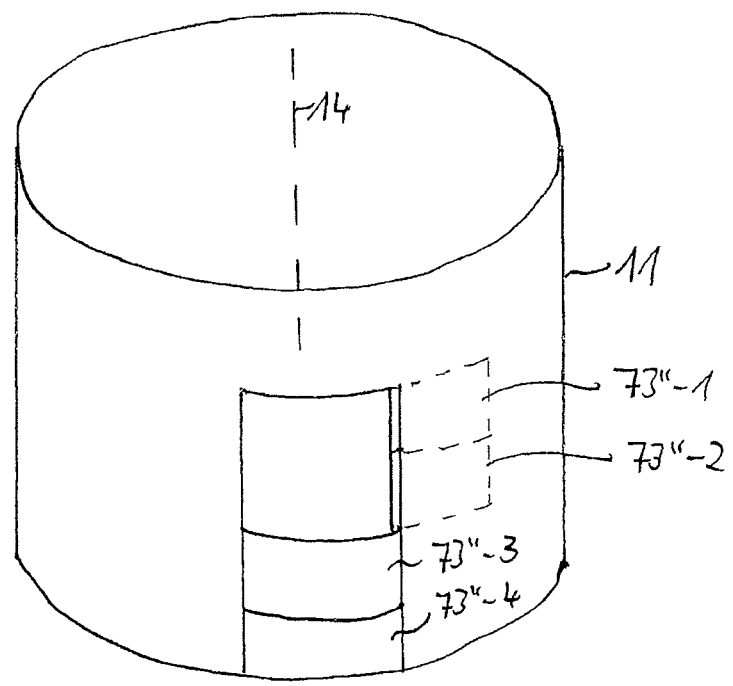

Four slides 73"-1 to 73"-4, which are arranged one above the other and which can be swiveled about a vertical axis 14 relative to the dome 11 and independently of one another, are arranged at the dome 11 according to FIGS. 5a and 5b. In the position according to FIG. 5a, the uppermost slide 73"-1 is in an open position; the three lower slides 73"-2 to 73"-4 are in a closed position. In this position, only the uppermost part of the removal opening 42 is released. In FIG. 5b, additionally the second slide from the top 73"-2 is in an open position. Thus, also a lower part of the removal opening 42 is released.

FIG. 6a shows a top view of a third apparatus according to the invention. It comprises a ring-shaped tray 20 having an opening in a central area 22. A vertically aligned central column 90, which is rotatable about a vertical axis 14, as well as a dome 11 extend through the opening in the central area 22. Three beam holders 93, to which a respective beam 45 is attached, are arranged at the column 90. The beams 45 extend outwardly from the beam holders 93 in the radial direction B and are arranged at an angular distance of 120° relative to one another. At the lower side of each beam 45 there are seven scrapers 91. The scrapers 91 are each formed as a rectangular plate and aligned at an angle α of about 50° relative to the radial direction B.

Figure 6B:
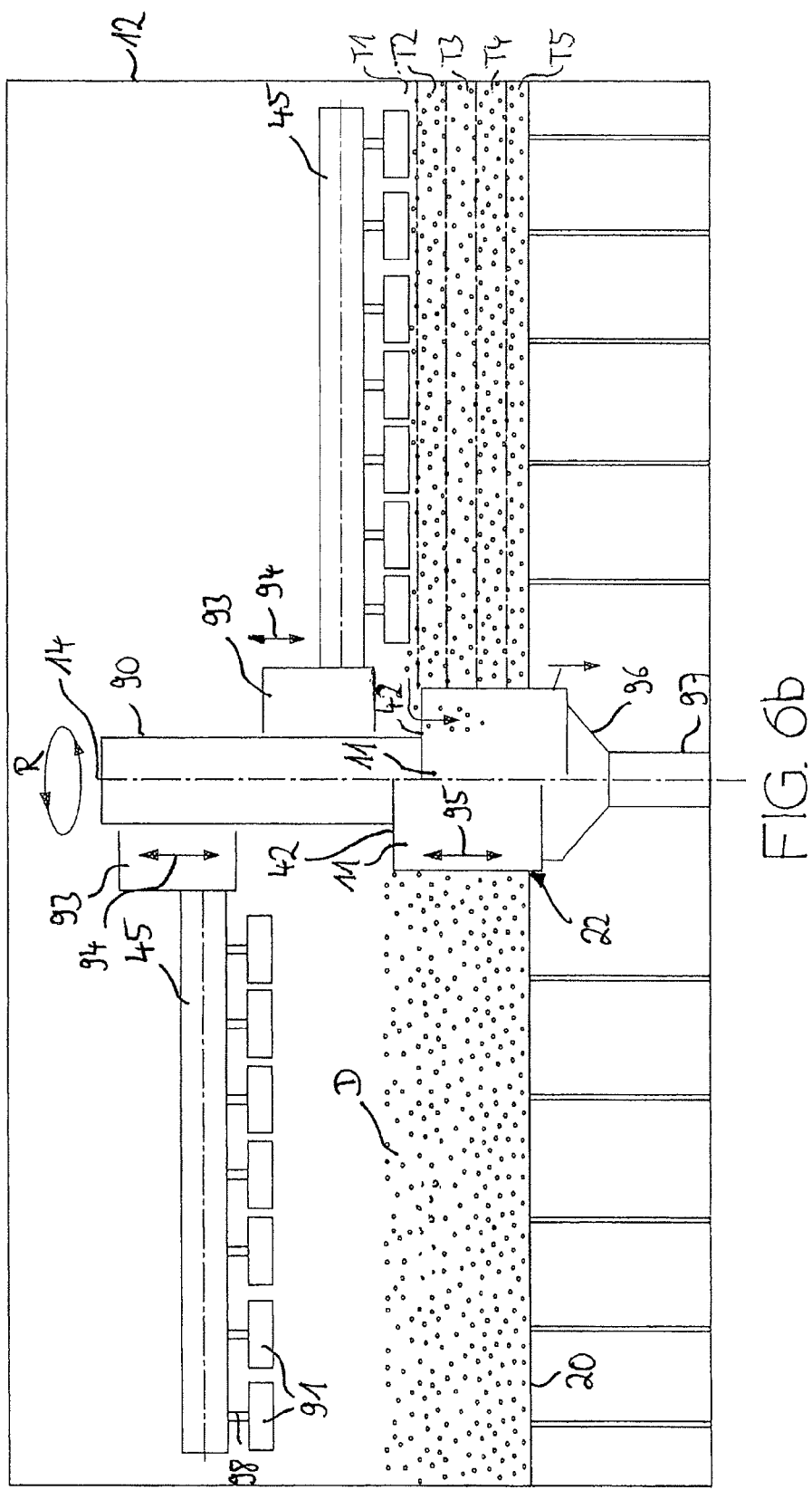

By rotating the column 90 and the beams 45 arranged thereon in the rotational direction R, the scrapers 91 move relative to the tray 20. Thus, removing surfaces 92 of the scrapers 91 come in contact with a layer of kilning material D arranged on the tray 20. Due to the selection of the angle α and the rotational direction R, this leads to a removal of a part of the layer of kilning material D into the central area 22 of the tray 20. FIG. 6b shows a sectional side view of the apparatus of FIG. 6a. FIG. 6b comprises a left half (to the left of the axis 14) and a right half (to the right of the axis 14). The left and right halves show different operating positions of the apparatus at different points in time, wherein said positions are shown in one and the same drawing for clarifying the function.

As indicated by the double arrows 94, the beam holders 93 (both those shown in the left half of FIG. 6a and also the two further beams 45) are movable in the vertical direction, i.e. parallel to the axis 14, relative to the column 90. Hence, it is possible to adjust the height of the beams 45 and thus also the height of the scrapers 91 which are attached to a beam 45 by means of a respective holding arm 98. It is pointed out that in the presently described embodiment, the beams 45 are in fact arranged always at the same height. FIG. 6b shows different heights in the left half and in the right half, but they are present at different points in time. The dome 11 is shaped like a cylindrical tube and comprises a removal opening 42 at its upper side. Also the dome 11 is movable in the vertical direction, as indicated by the double arrow 95.

In the operating position shown at the left, the shown beam 45 (as well as the two further beams 45 not shown here) are above the layer of kilning material D. The dome 11 is in such a vertical position that the removal opening 42 is approximately at the same height as the upper side of the layer of kilning material D. In this operating position, the kilning material on the tray 20 can be kiln dried.

By lowering the beam holders 93, also the beams 45 and the scrapers 91 are lowered so that they enter into the uppermost partial layer T1 of the layer of kilning material D. At the same time, the dome 11 is lowered until the removal opening 42 lies below the upper side of the layer of kilning material D. By rotating the column 90 and thus also the scrapers 91, the uppermost partial layer T1 of the layer of kilning material is removed in the direction of the central area 22 and, there, falls through the removal opening 42 and through a funnel 96 into a collecting tube 97 where the kilning material is collected. Preferably, lowering of the scrapers 91, lowering of the dome 11 and rotation of the scrapers 91 about the axis 14 take place synchronously. After removal of the first partial layer T1, also the two further partial layers T2, T3, T4 and T5 can be removed successively.

The invention claimed is:

1. An apparatus for kiln drying kilning material, said apparatus comprising:
at least one process space having at least one tray arranged therein for receiving a layer of kilning material;
the tray comprising:
at least one opening; and
at least one fan for generating a gas flow; and
a kilning material remover;
wherein the kilning material remover is rotatable in relation to the tray about an axis;
wherein the kilning material remover comprises at least one conveying screw configured to remove and convey at least once a partial layer of the layer of kilning material out of the process space; and
wherein the fan is configured and arranged to generate the gas flow from a space facing the layer of kilning material to a space facing away from the layer of kilning material through the layer of kilning material.

2. An apparatus according to claim 1, wherein:
the apparatus is configured in such a manner that the layer of kilning material and the kilning material remover are movable in relation to one another substantially along a vertical in relation to the tray.

3. An apparatus according to claim 1, wherein:
a longitudinal axis of the conveying screw extends substantially in a horizontal direction; and
the conveying screw is rotatable about the substantially vertical rotational axis.

4. An apparatus according to claim 1, wherein:
the kilning material remover device comprises at least one scraper.

5. An apparatus according to claim 1, further comprising:
a dome arranged in a central area of the tray; and
the kilning material remover being configured to convey the partial layer of the layer of kilning material in a direction towards the dome.

6. An apparatus according to claim 1, further comprising:
a cooler configured to cool the treated kilning material.

7. A product obtained by the apparatus according to claim 1.

8. A method for kiln drying kilning material, the method at least comprising the following:
(i) providing the kilning material to be treated on a tray having at least one opening for forming a layer of kilning material on the tray;
(ii) generating a gas flow flowing through the layer of kilning material;
(iii) at least once removing a partial layer of the layer of kilning material facing away from the tray from a space of the tray facing the layer of kilning material;

the at least once removing is carried out by a rotatable remover, the rotatable remover being rotatable in relation to the tray about an axis;
the air flow being generated from the space of the tray facing the layer of kilning material to a space of the tray facing away from the layer of kilning material through the layer of kilning material.

9. A method according to claim 8, wherein:
the partial layer of the layer of kilning material is removed by means of at least one conveying screw and/or at least one scraper.

10. A method according to claim 8, wherein:
the partial layer of the layer of kilning material is removed in a direction of a central area of the tray.

11. A method according to claim 8, wherein:
in at least one of the at least once removing a partial layer of the layer of kilning material, the partial layer is removed whose vertical dimension is at most 10% of a vertical dimension of an entirety of the layer of kilning material before a first removal of a partial layer.

12. A method according to claim 8, wherein:
in at least one of the at least once removing a partial layer of the layer of kilning material, the partial layer is removed whose vertical dimension is at most 25% of a vertical dimension of an entirety of the layer of kilning material before a first removal of a partial layer.

13. A method according to claim 8, wherein:
in at least one of the at least once removing a partial layer of the layer of kilning material, a partial layer is removed whose vertical dimension is at most 50% of a vertical dimension of an entirety of the layer of kilning material before a first removal of a partial layer.

14. A method according to claim 8, wherein:
the at least once removing a partial layer of the layer of kilning material facing away from the tray from the space comprises several times removing a partial layer of the layer of kilning material facing away from the tray from the space.

15. A product obtained by the method according to claim 8.

16. An apparatus according to claim 1, wherein:
the apparatus is configured to carry out the method according to claim 8.

17. An apparatus according to claim 16, wherein:
the axis is a substantially vertical axis.

18. An apparatus according to claim 1, wherein:
the axis is a substantially vertical axis.

19. A method according to claim 8, wherein:
the kilning material is one of the following: cereals, pseudocereals, oilseeds, or legumes.

20. A method according to claim 8, wherein:
the gas flow is an air flow.

21. A method according to claim 8, wherein:
the axis is a substantially vertical axis.

22. A method according to claim 8, wherein:
in each of the at least once removing a partial layer of the layer of kilning material, a partial layer is removed whose vertical dimension is at most 50% of a vertical dimension of an entirety of the layer of kilning material before a first removal of a partial layer.

* * * * *